United States Patent
Borsoi et al.

(10) Patent No.: US 10,877,299 B2
(45) Date of Patent: Dec. 29, 2020

(54) EYEGLASSES WITH IDENTIFICATION DEVICE

(71) Applicant: LUXOTTICA S.R.L., Agordo (IT)

(72) Inventors: Fabio Borsoi, Walnut Creek, CA (US); Valerio Oliana, Tione di Trento (IT)

(73) Assignee: LUXOTTICA S.R.L., Agordo (IT)

( * ) Notice: Subject to any disclaimer, the term of this patent is extended or adjusted under 35 U.S.C. 154(b) by 80 days.

(21) Appl. No.: 16/063,636

(22) PCT Filed: Dec. 21, 2016

(86) PCT No.: PCT/EP2016/082221
§ 371 (c)(1),
(2) Date: Jun. 18, 2018

(87) PCT Pub. No.: WO2017/108981
PCT Pub. Date: Jun. 29, 2017

(65) Prior Publication Data
US 2019/0004338 A1 Jan. 3, 2019

(30) Foreign Application Priority Data
Dec. 23, 2015 (IT) .................. 102015000087021

(51) Int. Cl.
G02C 1/00 (2006.01)
G02C 11/00 (2006.01)
G02C 11/02 (2006.01)
G06K 19/077 (2006.01)

(52) U.S. Cl.
CPC .............. *G02C 11/10* (2013.01); *G02C 11/02* (2013.01); *G06K 19/077* (2013.01); *G06K 19/07758* (2013.01); *G06K 19/07762* (2013.01)

(58) Field of Classification Search
CPC .................................. G02C 11/10; G02C 5/14
USPC ........................................ 351/158, 41, 51, 52
See application file for complete search history.

(56) References Cited

U.S. PATENT DOCUMENTS

| 2009/0303429 A1 | 12/2009 | Boulas et al. |
| 2015/0261013 A1 | 9/2015 | Dobson et al. |
| 2017/0108715 A1* | 4/2017 | Bauer ............... H04W 4/90 |

FOREIGN PATENT DOCUMENTS

| EP | 2804133 A1 | 11/2014 |
| FR | 2897168 A1 | 8/2007 |
| KR | 100893185 B1 | 4/2009 |

OTHER PUBLICATIONS

International Search Report dated Feb. 23, 2017 re: Application No. PCT/EP2016/082221, pp. 1-3, citing: US 2009/303429 A1, FR 2 897 168 A1, US 2015/261013 A1 and EP 2 804 133 A1.
Written Opinion dated Feb. 23, 2017 re: Application No. PCT/EP2016/082221, pp. 1-3.

* cited by examiner

*Primary Examiner* — Hung X Dang
(74) *Attorney, Agent, or Firm* — Cantor Colburn LLP

(57) ABSTRACT

Eyeglasses including a frame and a decorative insert associated with the frame and further include an identification device disposed between the frame and the decorative insert, the identification device adapted to be read by an external reader.

10 Claims, 4 Drawing Sheets

EYEGLASSES WITH IDENTIFICATION DEVICE

TECHNICAL FIELD

The present disclosure relates to eyeglasses with an identification device, and in particular a temple of eyeglasses which is provided with an identification device, and also to a decorative insert for eyeglasses, which is also provided with an identification device.

The identification device is adapted to allow the identification of authentic products from counterfeit products and to enable the traceability of those products.

BACKGROUND

As is known, one of the major problems in today's world is the counterfeiting of products and the gray market. Eyeglasses are no exception to the problem of counterfeiting and the gray market, and therefore the need is felt to provide eyeglasses provided with identification devices that enable traceability and make it possible to distinguish authentic products from counterfeit products.

The identification devices are usually constituted by RFID tags, or generically by chips provided with antennae.

The chip must be read by an external device so that the authenticity of the eyeglasses can be verified and so that the traceability data can be associated, precisely by virtue of reading the identification data contained in the memory of the chip.

Eyeglasses are currently known which are provided with identification chips located inside the frame itself in various positions, such as for example the temples, proximate to the hinges, and the like. All such solutions, however, have a major impact on the production of the eyeglasses frame and therefore they are not economically attractive, as well as the fact that the appearance of the eyeglasses is often compromised by the presence of the chip.

Furthermore it is known that the operation of an identification device is greatly influenced by the presence of highly conductive materials in its neighborhood since such materials impede, and can prevent, an effective communication between the RFID identification device and the external reader.

In particular when a conductor, for example a metal, is immersed in an electromagnetic field, micro-currents are induced inside it, owing to the freedom of movement of the electrons in the conduction band. The motion and intensity of such currents depend on the direction and intensity of the external electromagnetic field, and also on the properties of the conductor itself, such as for example resistivity and geometry. If the micro-currents induced in the conductor proximate to the RFID identification device are such as to interfere, by weakening or impeding the electromagnetic field generated by the external reader from reaching the RFID identification device, the reading does not occur.

SUMMARY

The aim of the present disclosure is to provide eyeglasses with an identification device that can be arranged in a position such that the appearance of the eyeglasses is not damaged, and at the same time without compromising the correct transmission of the signals between the identification device and external readers.

Within this aim, the present disclosure provides eyeglasses with an identification device that can be arranged in a position such that the manufacturing of the eyeglasses does not have a negative economic impact.

The disclosure further provides eyeglasses with an identification device, wherein the identification device can be hidden from sight once fitted.

The present disclosure also provides eyeglasses with an identification device, wherein the identification device can be easily read by an external reader.

The present disclosure further provides eyeglasses with an identification device that are highly reliable, easily and practically implemented and low cost.

These aims and these and other advantages which will become better apparent hereinafter are achieved by providing eyeglasses comprising a frame and a decorative insert associated with said frame, characterized in that it comprises, between said frame and said decorative insert, an identification device adapted to be read by an external reader, and also by a decorative insert, particularly for eyeglasses, characterized in that it comprises an identification device adapted to be read by an external reader.

BRIEF DESCRIPTION OF THE DRAWINGS

Further characteristics and advantages of the disclosure will become better apparent from the detailed description of a preferred, but not exclusive, embodiment of eyeglasses with identification device, illustrated by way of non-limiting example with the aid of the accompanying drawings wherein.

DETAILED DESCRIPTION OF THE DRAWINGS

Figure 1:
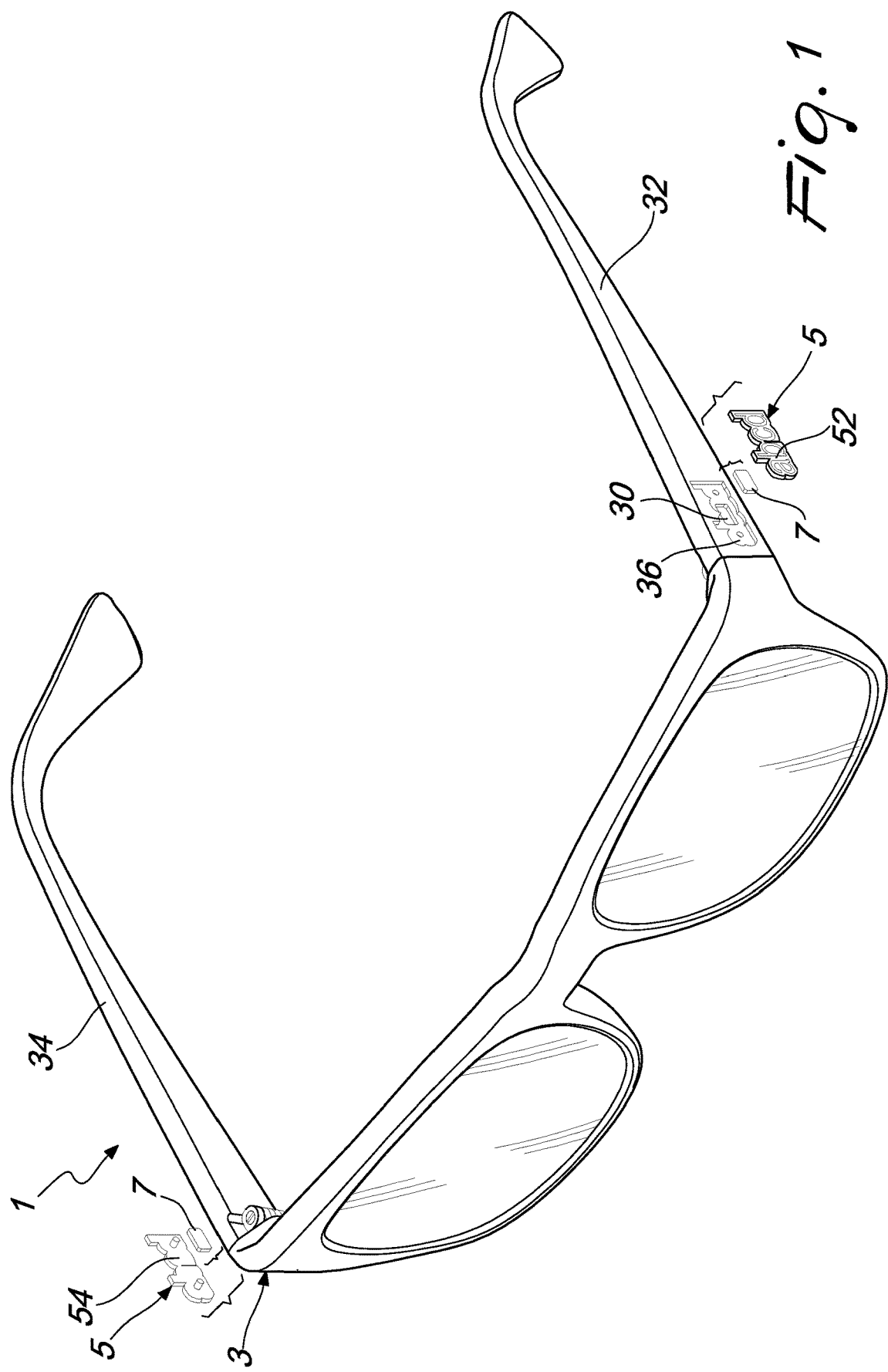
FIG. 1 is an exploded perspective view of an embodiment of eyeglasses with an identification device, according to the disclosure.
Figure 2:
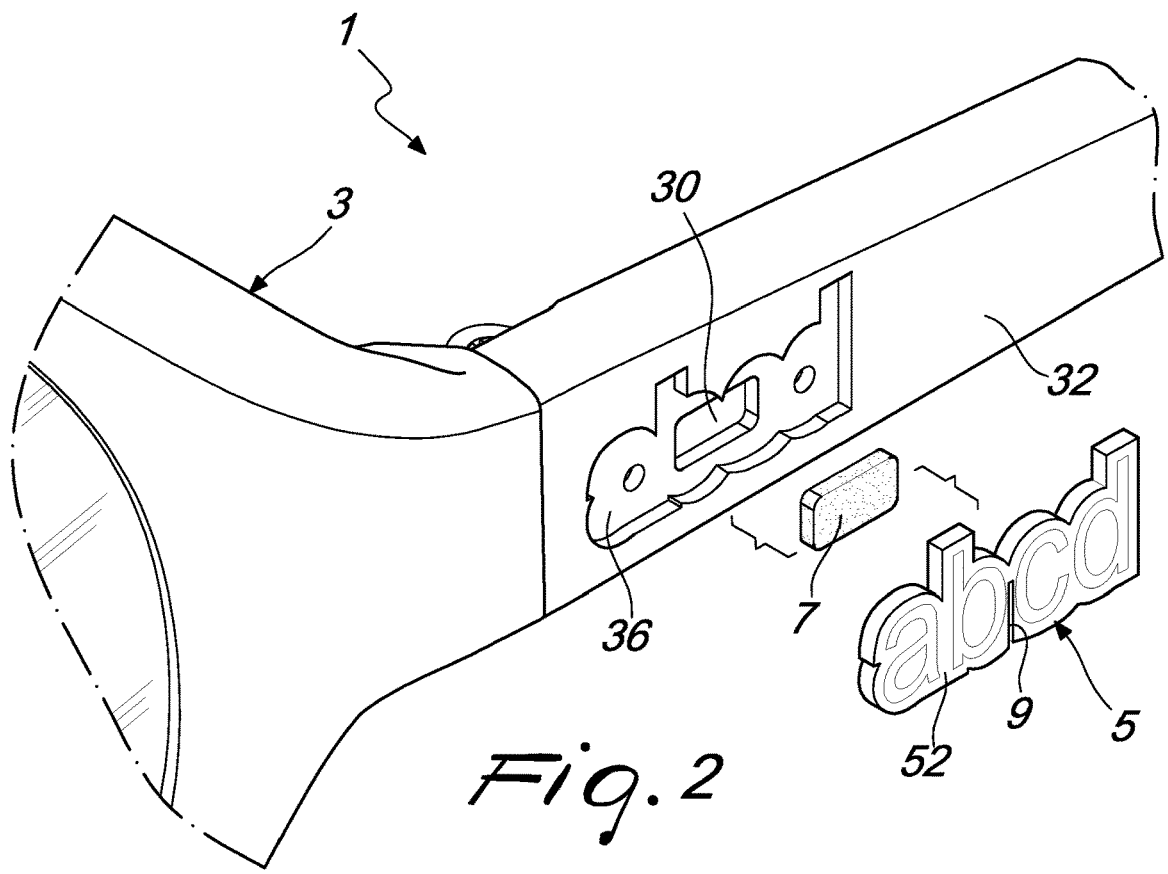
FIG. 2 is an exploded perspective view of a portion of eyeglasses with an identification device, according to the disclosure.
Figure 3:
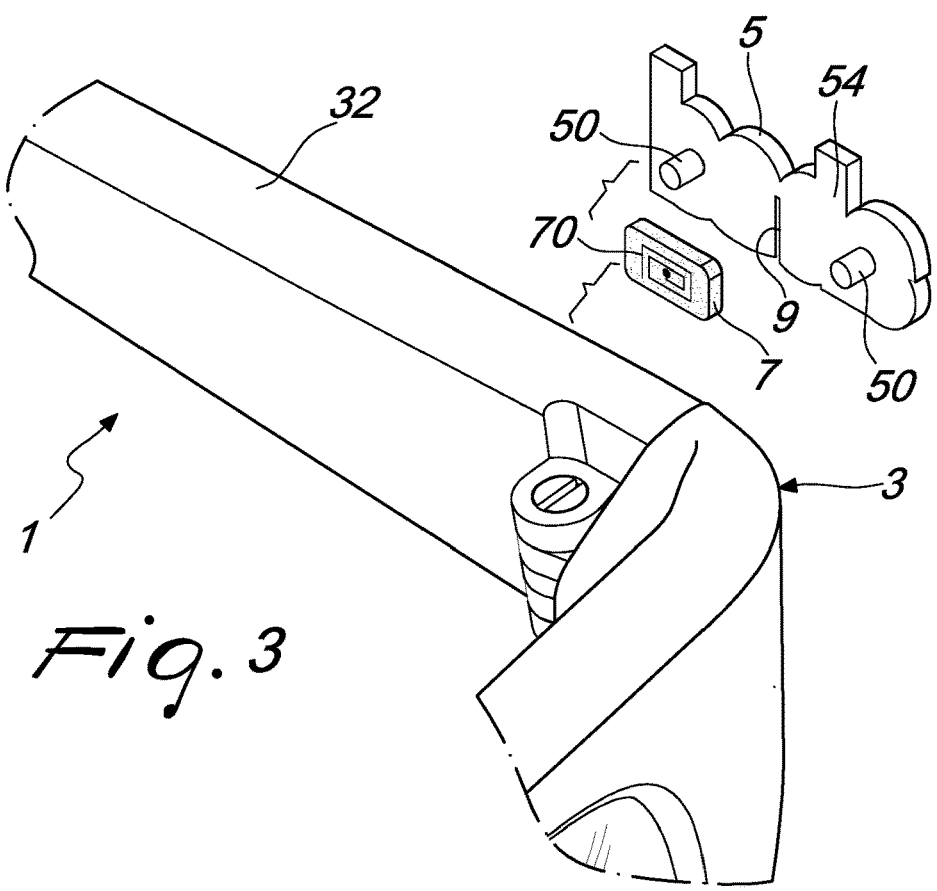
FIG. 3 is a different exploded perspective view of a portion of eyeglasses with an identification device, according to the disclosure.
Figure 4:
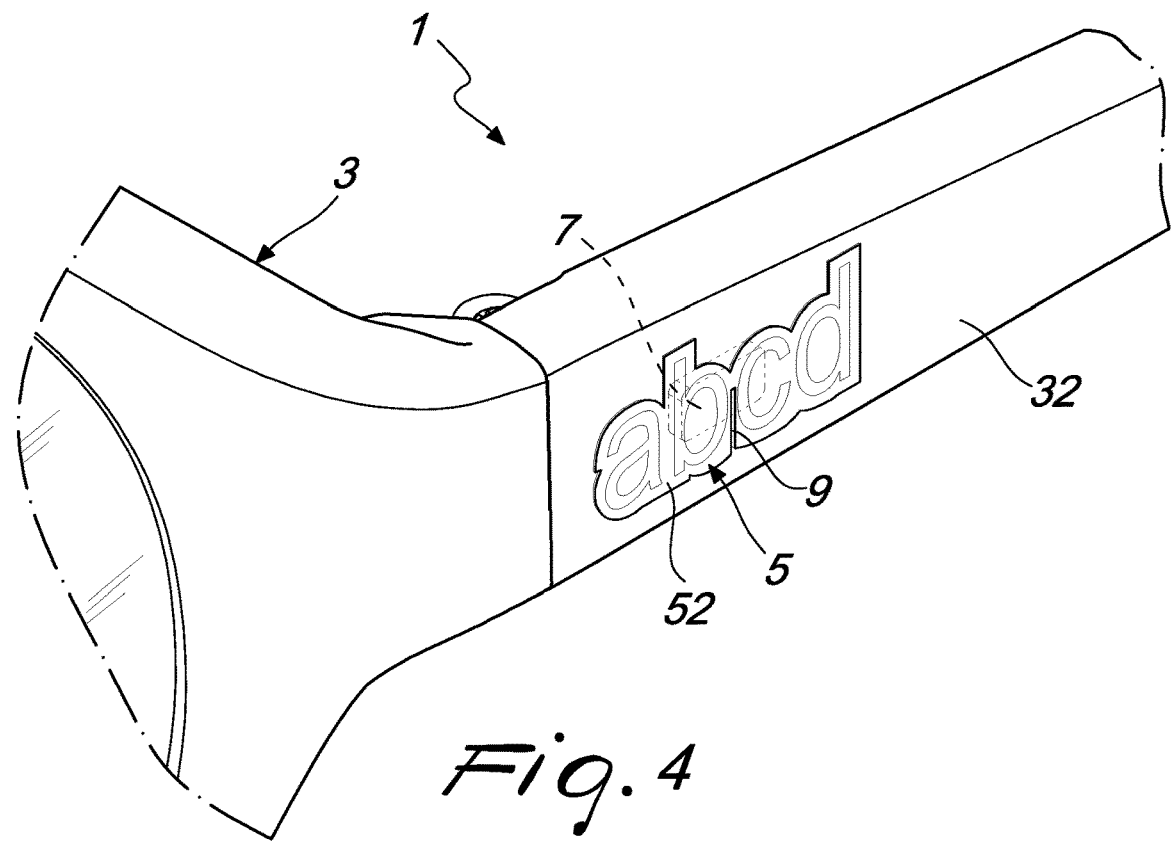
FIG. 4 is a perspective view of a portion of eyeglasses with an identification device, according to the disclosure.
Figure 5:
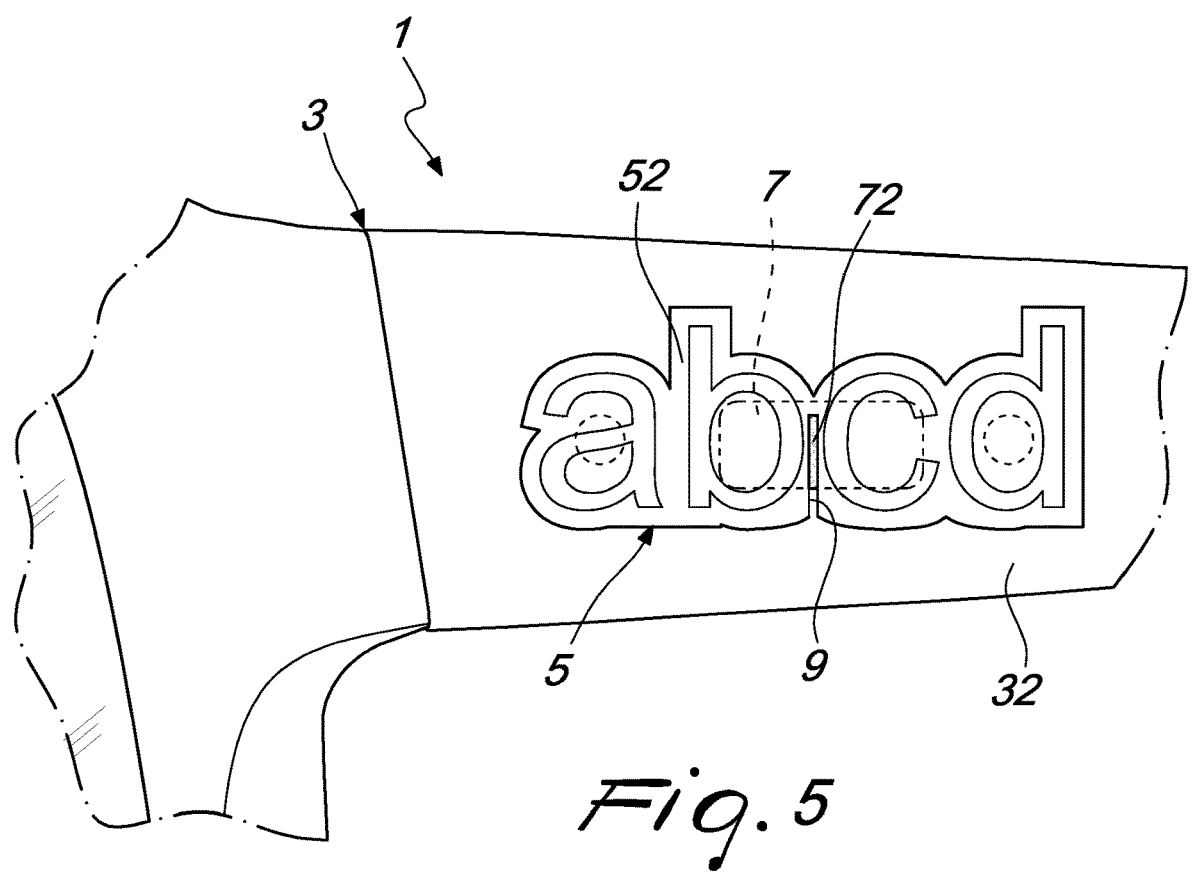
FIG. 5 is a side view of the portion of eyeglasses shown in FIG. 4.

With reference to FIGS. 1-6, the eyeglasses, generally designated by the reference numeral 1, comprise a frame 3 and a decorative insert 5 associated with the frame 3.

According to the disclosure, the eyeglasses 1 comprise, between the frame 3 and the decorative insert 5, an identification device 7 adapted to be read by an external reader.

The decorative insert 5 advantageously comprises, at the identification device 7, a slot 9 adapted to allow the transmission of data between the identification device 7 and the external reader.

In particular, the identification device 7 can be arranged astride the slot 9.

The decorative insert 5 can be a decorative plate, and can fulfill an aesthetic/decorative function of the eyeglasses 1, and/or an identification function of the brand of the eyeglasses 1.

The decorative insert 5 can have different shapes, different volumes, different colors. The decorative insert 5 can be constituted by the brand of the eyeglasses 1, by one or more graphic elements, or by a combination of both.

The decorative insert 5 can be contoured to follow the outlines of the decorative elements that it carries, forming a single body with such decoration, or it can have its own shape, different from that of the decorative elements that it carries. In this case the decorative insert 5 is advantageously adapted to act as a support for an element that is more strictly decorative.

Advantageously the decorative insert 5 can be made of a material such as metal or such as a metallic alloy. For example the decorative insert 5 can be made of steel, nickel silver, zamak or the like, and made with different technologies, such as die casting, casting, printing and cutting, photo-etching and the like.

The identification device 7 can be integrated in the frame 3, in particular if the eyeglasses 1 are made of a material of the type of plastic. In this case the decorative insert 5, which can be made of a material of the type of metal, is advantageously coupled to the frame 3 proper.

Advantageously the frame 3 or the decorative insert 5 comprise a seat for accommodating the identification device 7.

As illustrated in the accompanying figures, the frame 3 can comprise a seat 30 adapted to accommodate the decorative insert 5 inside it, so that, once the decorative insert 5 is applied to the frame 3, for example by way of a pair of pins 50, the identification device 7 is at least partially accommodated in the seat 30.

Obviously it is likewise possible to have a seat for accommodating the identification device 7 in the decorative insert 5 proper.

Advantageously, the decorative insert 5 can be applied to the outer surface of the frame 3 so as to protrude outward therefrom, or, as illustrated in the accompanying figures, it can be accommodated in a seat 36, provided in the frame 3 and configured to accommodate the decorative insert 5.

In this case the seat 30 of the identification device 7 is provided inside the seat 36 of the decorative insert 5.

Advantageously the seat 30 of the identification device 7 can be provided in the frame 3 by mechanical machining, or directly during the step of molding the frame 3 proper.

Advantageously the identification device 7 is visually concealed by the decorative insert 5 except for the portion 72 that remains visible through the slot 9.

Since the slot 9 is adapted to allow the transmission of electromagnetic signals, it can be advantageously made small at will.

The slot 9 can be advantageously provided by way of laser cutting, by way of mechanical machining, or directly during the molding of the decorative insert 5.

Advantageously, by virtue of the presence of the slot 9, the reading of the identification device 7 can be carried out, by way of the external reader, from the front visible side 52 of the decorative insert 5.

The reading of the identification device 7 can in any case be carried out, by way of the external reader, from the inner side of the frame 3, i.e. on the opposite side of the frame 3 with respect to the side where the decorative insert 5 is positioned.

The identification device 7 comprises an antenna 70, which is advantageously directed in the opposite direction with respect to the visible surface 52 of the decorative insert 5.

In fact the identification device 7 comprises generally a chip and an antenna which are accommodated inside a rectangular package.

Advantageously, furthermore, the identification device 7 is arranged substantially parallel with respect to the rear, non-visible, surface 54 of the decorative insert 5.

Advantageously, between the antenna 70 and the decorative insert 5 there can be an electromagnetic coupling effect such that the decorative insert 5 itself acts as an antenna or as a repeater of the electromagnetic signal.

The frame 3 advantageously comprises a pair of temples 32 and 34 and the identification device 7 is advantageously arranged between at least one of the two temples 32, 34 and the decorative insert 5. As shown in FIG. 1, both temples 32 and 34 can comprise, between the temples 32 and 34 proper and the corresponding decorative inserts 5, an identification device 7.

Figure 6:
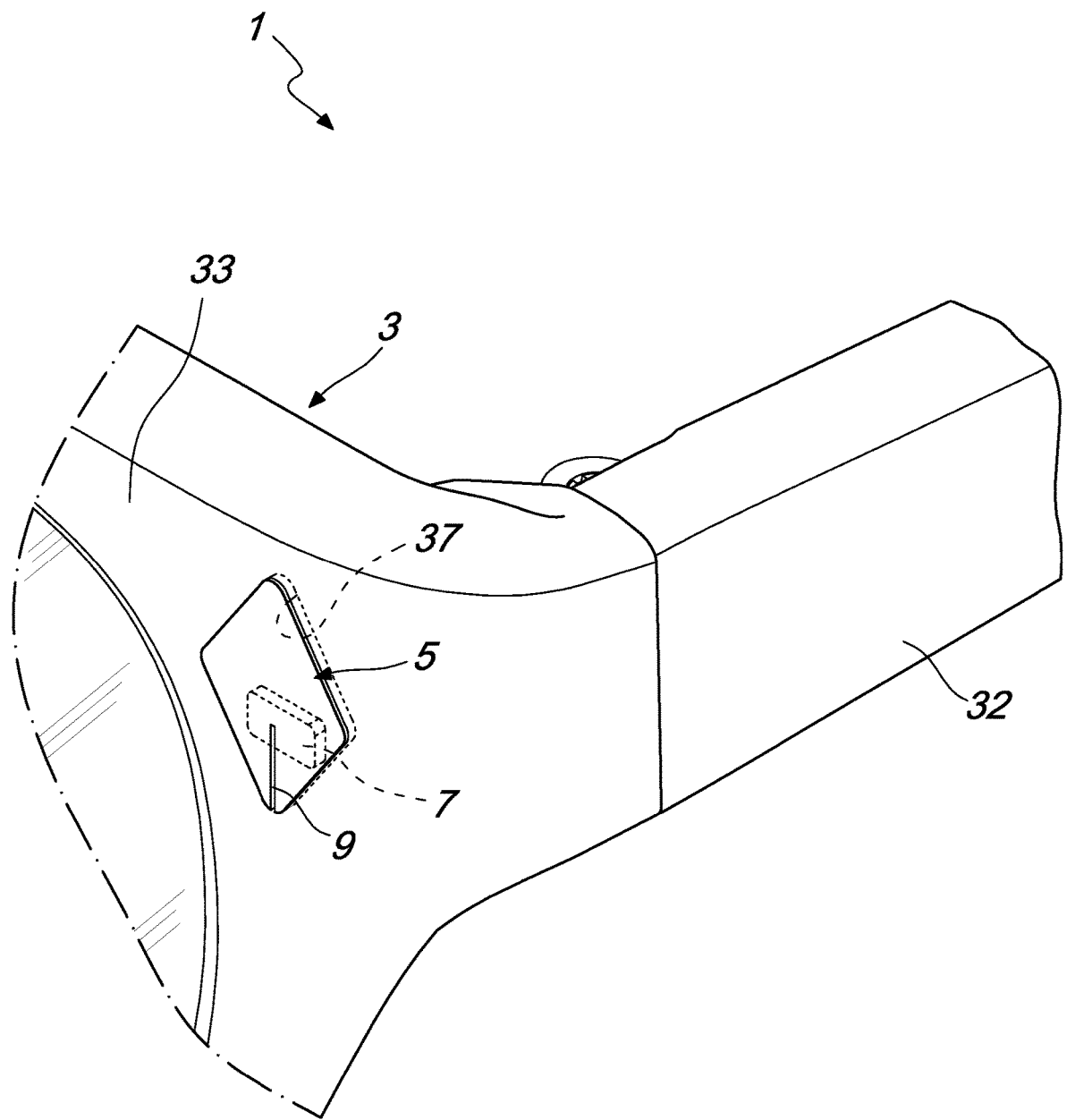
FIG. 6 is a perspective view of a portion of a variation of eyeglasses with an identification device, according to the disclosure.

As shown in FIG. 6, the frame 3 can comprise a front 33. The identification device 7 is advantageously arranged between the front 33 and the decorative insert 5. The decorative insert 5 can be at least partially accommodated in a seat 37 provided in the front 33 proper.

The identification device 7 can be applied to the decorative insert 5, or to the frame 3, by way of adhesive bonding. Such adhesive bonding can occur with the use of a liquid adhesive, or by providing the identification device 7 with an adhesive film on one of the two sides thereof.

Advantageously the decorative insert 5, with the identification device 7 associated therewith, can be mounted onto the frame 3 by pressure, by way of the two pins 50, which can be inserted into two corresponding holes prefabricated on the frame 3 proper.

The identification device 7 can be integrated directly within the seat 30 provided in the frame 3, at the position where the decorative insert 5 is arranged, so that the identification device 7 is arranged astride the slot 9.

Alternatively, the seat for the identification device 7 can be provided directly on the decorative insert 5, at the slot 9. The decorative insert 5 with the identification device 7 thus integrated can therefore be mounted onto the eyeglasses 1 without further machining or steps, with evident advantages in terms of reduction of costs and production times.

The present disclosure further relates to a decorative insert 5, particularly for eyeglasses, which comprises an identification device 7 adapted to be read by an external reader, which comprises preferably a slot 9 adapted to allow the transmission of data between the identification device 7 and the external reader, wherein preferably the identification device 7 is arranged astride the slot 9.

In practice it has been found that the eyeglasses with identification device and the decorative insert with identification device, according to the present disclosure, achieve the intended aims and advantages, since they enable an easy and correct reading of the identification device without in the least compromising the aesthetic appearance of the eyeglasses proper.

Another advantage of the eyeglasses and of the decorative insert, according to the disclosure, relates to the eyeglasses hiding the identification device from view without compromising the performance of transmission of the electromagnetic signal for reading the identification device proper, and actually improve it.

Another advantage of the eyeglasses and of the decorative insert, according to the disclosure, relates to the eyeglasses enabling the effective communication of the identification device, even by way of a reading from the front side of the decorative insert proper.

Another advantage of the eyeglasses and of the decorative insert, according to the disclosure, is in that the integration of the identification device in the frame is utterly simple. In particular the identification device can be fitted parallel to the direction of the decorative insert and of the surface of the frame, which is the same as the direction of picking of the identification device from the supply belt, thus avoiding a rotation operation thereof and thus reducing the costs and times of the production cycle.

The eyeglasses with an identification device, and the corresponding decorative insert, thus conceived, are susceptible of numerous modifications and variations.

Moreover, all the details may be substituted by other, technically equivalent elements.

In practice the materials employed, provided they are compatible with the specific use, and the contingent dimensions and shapes, may be any according to requirements.

The disclosures in Italian Patent Application No. 102015000087021 from which this application claims priority are incorporated herein by reference.

The invention claimed is:

1. Eyeglasses comprising a frame and a decorative insert associated with said frame, further comprising, an identification device disposed between said frame and said decorative insert, the identification device adapted to be read by an external reader, wherein said decorative insert comprises, at said identification device, a slot adapted to allow the transmission of data between said identification device and said external reader.

2. The eyeglasses according to claim 1, wherein said frame or said decorative insert comprise a seat for accommodating said identification device.

3. The eyeglasses according to claim 1, wherein said frame comprises a pair of temples and comprises, between at least one of said temples and said decorative insert, said identification device.

4. The eyeglasses according to claim 1, wherein said frame comprises a front and comprises, between said front and said decorative insert, said identification device.

5. The eyeglasses according to claim 1, wherein said identification device comprises an antenna directed in the opposite direction with respect to a visible surface of said decorative insert.

6. The eyeglasses according to claim 1, wherein said decorative insert is made of a material such as metal or a metallic alloy.

7. The eyeglasses according to claim 1, wherein said identification device is visually concealed by said decorative insert except for a portion of said identification device visible through said slot.

8. A decorative insert, particularly for eyeglasses, comprising an identification device adapted to be read by an external reader, further comprising, at said identification device, a slot adapted to allow the transmission of data between said identification device and said external reader.

9. The decorative insert according to claim 8, wherein said identification device is arranged astride said slot.

10. A temple for eyeglasses, comprising a decorative insert and an identification device adapted to be read by an external reader, which is arranged between said temple and said decorative insert, further comprising, at said identification device, a slot adapted to allow the transmission of data between said identification device and said external reader.

* * * * *